(12) United States Patent
Hesse et al.

(10) Patent No.: US 8,313,087 B2
(45) Date of Patent: Nov. 20, 2012

(54) POWDER FOR RAPID PROTOTYPING AND ASSOCIATED PRODUCTION METHOD

(75) Inventors: Peter Hesse, Cologne (DE); Tillmann Paul, Cologne (DE); Richard Weiss, Cologne (DE)

(73) Assignee: EOS GmbH Electro Optical Systems, Krailling (DE)

( * ) Notice: Subject to any disclaimer, the term of this patent is extended or adjusted under 35 U.S.C. 154(b) by 1145 days.

(21) Appl. No.: 10/593,573

(22) PCT Filed: Mar. 21, 2005

(86) PCT No.: PCT/EP2005/002991
§ 371 (c)(1),
(2), (4) Date: Jan. 17, 2007

(87) PCT Pub. No.: WO2005/090449
PCT Pub. Date: Sep. 29, 2005

(65) Prior Publication Data
US 2007/0267766 A1    Nov. 22, 2007

(30) Foreign Application Priority Data
Mar. 21, 2004    (WO) ................. PCT/EP2004/002965

(51) Int. Cl.
*B29B 9/10*    (2006.01)
(52) U.S. Cl. ............................. 254/12; 264/5
(58) Field of Classification Search .................. None
See application file for complete search history.

(56) References Cited

U.S. PATENT DOCUMENTS

| | | | |
|---|---|---|---|
| 4,764,424 A | | 8/1988 | Ganga et al. |
| 4,793,853 A | * | 12/1988 | Kale ................. 75/338 |
| 4,919,853 A | * | 4/1990 | Alvarez et al. ................. 264/12 |
| 4,960,818 A | | 10/1990 | Reilly et al. |
| 5,171,489 A | * | 12/1992 | Hirao et al. ....................... 264/8 |
| 5,247,052 A | | 9/1993 | Lucke et al. |
| 5,357,040 A | | 10/1994 | McGrath et al. |
| 5,370,911 A | | 12/1994 | Throne et al. |
| 5,731,388 A | | 3/1998 | Suzuki et al. |
| 5,733,497 A | | 3/1998 | McAlea et al. |
| 5,910,558 A | * | 6/1999 | Schoenherr et al. .......... 528/125 |
| 5,925,688 A | | 7/1999 | Ash et al. |

(Continued)

FOREIGN PATENT DOCUMENTS
CA    2251405 C    10/1998
(Continued)

OTHER PUBLICATIONS
U.S. Appl. No. 11/932,500, filed Oct. 31, 2007, Hesse, et al.
(Continued)

*Primary Examiner* — Mary F Theisen
(74) *Attorney, Agent, or Firm* — McDonnell Boehnen Hulbert & Berghoff LLP (57) ABSTRACT

Described are powders for use in the production of three-dimensional structures or molded bodies by means of layered manufacturing methods, and methods for the economical production thereof. The powders have the particularity that they have a good flow behavior, on the one hand, and that they are simultaneously configured such that the molded body produced with the powder in rapid prototyping has substantially improved mechanical and/or thermal characteristics. In accordance with a particularly advantageous embodiment, the powder comprises a first fraction that is present in the form of substantially spherical powder particles and that is formed by a matrix material, and at least one further fraction in the form of strengthening and/or reinforcing fibers that are preferably embedded into the matrix material.

7 Claims, 4 Drawing Sheets

U.S. PATENT DOCUMENTS

| | | | |
|---|---|---|---|
| 6,003,832 A | 12/1999 | Ueno et al. | |
| 6,067,480 A | 5/2000 | Stuffle et al. | |
| 6,136,948 A | 10/2000 | Dickens, Jr. et al. | |
| 6,533,563 B1 * | 3/2003 | Otaigbe et al. | 425/6 |
| 6,949,216 B2 | 9/2005 | Brice et al. | |
| 7,240,520 B2 * | 7/2007 | Edlinger | 65/454 |
| 2001/0050031 A1 | 12/2001 | Bredt et al. | |
| 2002/0053257 A1 | 5/2002 | Brice et al. | |
| 2002/0149137 A1 | 10/2002 | Jang et al. | |
| 2002/0185782 A1 | 12/2002 | Koch et al. | |
| 2003/0010409 A1 | 1/2003 | Kunze et al. | |
| 2004/0023145 A1 | 2/2004 | Moussa et al. | |
| 2005/0197446 A1 | 9/2005 | Loyen et al. | |
| 2005/0207931 A1 | 9/2005 | Hesse et al. | |
| 2006/0103054 A1 | 5/2006 | Pfeifer et al. | |
| 2006/0134419 A1 | 6/2006 | Monsheimer et al. | |
| 2006/0159896 A1 | 7/2006 | Pfeifer et al. | |
| 2007/0238056 A1 | 10/2007 | Baumann et al. | |
| 2007/0267766 A1 | 11/2007 | Hesse et al. | |

FOREIGN PATENT DOCUMENTS

| | | |
|---|---|---|
| CA | 2564971 | 11/2005 |
| CA | 2530762 | 6/2006 |
| DE | 43 01 543 A1 | 7/1994 |
| DE | 19747309 A1 | 4/1999 |
| DE | 10055465 A1 | 5/2001 |
| DE | 10122492 A1 | 11/2002 |
| DE | 101 29 305 A1 | 12/2002 |
| DE | 103 26 919 A1 | 1/2004 |
| DE | 10 2004 020 452 A1 | 12/2005 |
| DE | 102004062761 A1 | 6/2006 |
| EP | 0 001 879 A1 | 5/1979 |
| EP | 0 026 806 | 4/1981 |
| EP | 0 026 806 A1 | 4/1981 |
| EP | 0 196 972 | 10/1986 |
| EP | 0 377 170 | 7/1990 |
| EP | 0 879 137 | 11/1998 |
| EP | 0968080 B1 | 1/2000 |
| EP | 1 170 318 | 1/2002 |
| EP | 1 571 173 | 9/2005 |
| EP | 1 674 497 | 6/2006 |
| FR | 1525016 | 5/1968 |
| FR | 2803243 A1 | 7/2001 |
| GB | 1147052 | 4/1969 |
| JP | 8-505180 A | 6/1996 |
| JP | 2000-505737 A | 5/2000 |
| JP | 2003-531220 A | 10/2003 |
| RU | 1291287 A1 | 2/1987 |
| RU | 94041837 A1 | 8/1996 |
| RU | 2 086 356 C1 | 8/1997 |
| RU | 2 223 994 C2 | 6/2003 |
| WO | WO 92/02142 | 2/1992 |
| WO | WO 93/18900 | 9/1993 |
| WO | 94/15999 | 7/1994 |
| WO | 94 15999 | 7/1994 |
| WO | 98/09798 A1 | 3/1998 |
| WO | WO 00/58389 | 10/2000 |
| WO | 01/78969 A2 | 10/2001 |
| WO | 02/11928 A1 | 2/2002 |
| WO | 02/11929 A1 | 2/2002 |
| WO | 02/070031 A1 | 9/2002 |
| WO | 03/106146 A1 | 12/2003 |

OTHER PUBLICATIONS

Duraform PA and GF, Materials for systems SLS, 2001.
Duraform PA and GF, Materials for SLS®, 2001 (reference previously filed on Jun. 12, 2009, submitting full English translation only).
Forderhase, et al., "The Development of a SLS Composite Material, Solid Freeform Fabrication Proceedings" (SFF), Sep. 1995, pp. 287-297, The University of Texas at Austin.
Schultz, et al., "Cryogenic Mechanical Alloying of Poly (ether ether ketone)—Polycarbonate Composite Powders for Selective Laser Sintering, Solid Freeform Fabrication Proceedings" (SFF), Aug. 1999, pp. 311-318, The University of Texas at Austin.
Chua, et al., "Development of Scaffolds for Tissue Engineering Using Selectie Laser Sintering," Society of Manufacturing Engineers, 2003, pp. 1-9.

* cited by examiner

POWDER FOR RAPID PROTOTYPING AND ASSOCIATED PRODUCTION METHOD

The invention generally refers to the production of three-dimensional, in particular of three-dimensionally complex structures or molded bodies by means of layered manufacturing methods such as they are also known under the term "powder-based generative rapid prototyping" or "solid free from fabrication (SFF)" methods. Such powder-based generative rapid prototyping methods are, for instance, known under the designations 3D laser sintering, 3D laser melting, or 3D printing.

The invention relates in particular to a powder for use in such a method, and to methods for the economical production of such a powder.

Methods for the production of molded bodies of complex structure which are nowadays known and which are, as a rule, computer-controlled additive, automatic methods, usually work with fills of powdered materials that are heated layer by layer at particular places or regions, respectively, to such an extent that a fusing or sintering process takes place. For heating, a preferably program-controlled laser beam, or—if metallic powder materials are used—an energy-rich electron beam is used as a rule.

Meanwhile, various powders have been developed for this technology. Reference is made in this respect, for instance, to the documents DE 101 22 492 A1, EP 0 968 080 B1, WO 03/106146 A1, or DE 197 47 309 A1 in the field of plastic powders, or to WO 02/11928 A1 in the field of metallic powders.

In order that the molding process can be carried out without problems with high process stability, powder particles are required that stand out by a particularly good "flow behavior" on application of the powder layer, which is ensured in that the powder particles are formed as spherical as possible with a surface as smooth as possible.

So far, the material polyamide, especially a higher-networked polyamide such as PA 11 or PA 12, has prevailed in particular for the initially described method.

With this powder material, however, the spectrum of use of the molded bodies produced therewith remains restricted. Therefore, one has been trying on various occasions to modify the powders so as to improve the mechanical characteristics of the molded body. One approach in this respect has been to add glass pellets or aluminum flakes to the thermoplastic powder.

With the glass pellets, a good flow capability indeed is maintained, but the improvements of the mechanical characteristics which can be achieved are restricted. A strengthening of the material is indeed possible (increase of the E-module), but the tensile strength cannot be increased in a noteworthy manner, and the improvements that can be achieved have to be bought with an embrittlement of the material. When aluminum flakes are used, these problems are even more distinctive.

It is therefore an object of the invention to improve the method for the production of molded bodies by means of selective sintering or melting of powdered materials such that, by maintaining the basic conception of the machine, molded bodies with substantially improved mechanical characteristics can be produced.

This object is solved by a new powder described herein and by the methods for the production of such powders described herein.

In accordance with a first aspect of the invention, the substantially spherical powder particles are formed by an aromatic polyetherketone, in particular a polyaryletherketone (PEEK) plastic with the repeating unit Oxy-1,4-Phenylen-Oxy-1,4- Phenylen-Carbonyl-1,4-Phenylen pursuant to the following formula:

This linear, aromatic polymer that is marketed under the designation "PEEK" by the Company Victrex is, as a rule, semi-crystalline and stands out by physical characteristics that are by far superior in every respect to the materials that have hitherto been used with SLS methods. It is not just the mechanical characteristics such as tensile strength and E-module that are by a multiple better than in the case of conventional PA powders. In addition, the thermal stability of this material is so good that the components manufactured from this material pursuant to the SLS method can even be used in cases in which even fiber-reinforced plastic materials have been overstrained so far.

The inventors have found that this material, by making use of a suitable method, is adapted to be processed to largely smooth and spherical powder particles which thus guarantee a sufficiently good flow capability of the powder, so that the individual layers can be applied with the highest precision possible. In supplement, the invention is supported by the idea of preferably processing the so-called PEEK powder in a so-called "isothermal" laser sintering process in which the surface of the powder fill is kept on a temperature that ranges by some few degrees below the relatively high melting temperature of the PEEK powder, and in which the remaining powder fill is also heated, but this temperature mostly ranges below the temperature of the surface of the powder fill.

In accordance with a second aspect of the invention there is provided a powder comprising a first fraction that is present in the form of substantially spherical powder particles and that is formed by a matrix material, and at least one further fraction in the form of strengthening and/or reinforcing fibers. The matrix material may be a plastic material or a metal. Tests have shown that, when the volume fraction of the fibers remains—depending on the fiber length distribution—restricted, for instance, to maximally 25%, preferably up to 15%, particularly preferred up to 10%, the flow capability of the powder is good to control. The test results show that, with PA12 as matrix material, a three-fold rigidity and a 50% increase of the tensile strength result with 10 percent fiber fraction (carbon fibers) by volume already.

For further improvement of the mechanical characteristics, the fiber fraction has to be increased. In accordance with the invention, the powder is produced with a higher fiber volume fraction by making use of the example production methods described herein, this making it possible to embed the fibers into the matrix material, namely preferably such that they are substantially fully enclosed by the matrix material. This way, the handling of the powder remains largely uninfluenced by the volume fraction of the fiber material. With Pal2 as matrix material and with a volume fraction of the carbon fibers of 30%, an increase of the tensile strength by 300% and an increase of the E-module by the factor 9 may be achieved.

If a thermoplastic plastic material is used as matrix material, substantial improvements of the mechanical characteristics can already be achieved vis-à-vis the non-reinforced material if flakes are used instead of the fibers, as long as their dimensions permit a preferably full embedding in the powder particles. This aspect is expressly included in the subject matter of the invention.

If the matrix material is formed by a plastic material, the fibers are preferably selected from the group of carbon and/or glass fibers.

Basically, the fiber may be produced in all the qualities that have been processed so far, wherein the powder particles may have a medium diameter d50 in the range from 20 to 150, preferably from 40 to 70 μm. The width of the grain size distribution should be as narrow as possible, so that the flow capability is not impaired too much.

The matrix material may, however, also be formed by a metallic material. The production methods of the powder particles with embedded fibers in accordance with methods described herein basically remain the same.

A metallic matrix material is preferably combined with fibers from the group of ceramic and of boron fibers.

In this case, the medium grain size d50 of the spherical powder particles advantageously ranges between 10 and 100, preferably between 10 and 80 μm. The value d50 means the measurement of the grain size that is under-run by 50% of the powder particles and exceeded by 50% of the powder particles.

The fiber length distribution is chosen such that a percentage of the fibers which is as low as possible projects from the surface of the particles that are produced during melt spraying or spray drying. This may, for instance, be achieved in that the medium length L50 of the fibers corresponds maximally to the value of the medium grain size d50 of the spherical powder particles.

A first advantageous method for the production of powder is described herein. With this method, it is possible to produce, as a function of the modifiable process parameters, substantially spherical powder particles that are indeed composed of a plurality of smaller particles, but have a sufficiently spherical and smooth surface to be used without problems with rapid prototyping methods.

This method may be performed with equal advantage in the presence of a second phase in the form of a strengthening or reinforcing fiber. As liquid phase of the suspension, all liquids are suitable that permit a uniform distribution of the micro powder particles and optionally of the reinforcing phase. Another relevant aspect in the selection of the liquid is the property of its evaporating or volatilizing rapidly and without residues.

Preferably, if the matrix material is selected from the group of thermoplastics, micro powder with a medium grain size d50 between 3 and 10 μm, preferably 5 μm, and optionally fibers, preferably with a medium length L50 from 20 to 150 μm, preferably from 40 to 70 μm, are used with this method. The value L50 designates the length that is exceeded by 50% of the fibers and under-run by 50% of the fibers.

For the matrix material metal, advantageous sizes of the particles are described herein.

An alternative method for the production of the inventive powder is described herein. It is mainly interesting for thermoplastic materials, but can basically also be used for metallic materials. The step of cooling is indispensable in the case of thermoplastic materials in order that the material is embrittled to such an extent that it is capable of being ground. Advantageously, cooling is performed by means of liquid nitrogen. Further advantageous developments of this method are described herein.

Further alternatives of the production method are the so-called prilling method, or the melt spraying method, which can also be used for metallic and thermoplastic materials.

The transfer of the matrix material, e.g. of a thermoplastic, to the liquid phase may, for instance, be performed by using a solvent. The solidification of the droplets may e.g. be performed in that the solvent is transferred to the gaseous state of aggregation. This may, for instance, happen by means of evaporating or volatilizing. The evaporation energy withdrawn from the droplets may be used for accelerating the solidification. In supplement, active heating may be performed.

Important process parameters for setting the desired grain size distribution are: temperature of the liquid phase or of the melt, respectively; viscosity and surface tension of the liquid phase or of the melt, respectively; nozzle diameter; speed, volume flow, pressure, and temperature of the gas flow.

In an example of melt spraying, the atomization of the melt is preferably performed in a hot gas jet.

With the inventive powder that can be produced by using an inventive method, the range of application of components or molded bodies that have been generated by means of layered manufacturing methods (powder-based generative rapid prototyping methods) e.g. pursuant to SLS (Selective Laser Sintering) or laser melt technology, can distinctly be enlarged. With the invention, it is thus for the first time possible to make meaningful use of such a layered manufacturing method for the production of hollow molded bodies with interior, preferably three-dimensional framework-like struts. For, so far, the mechanical characteristics of the material have been so poor that a use in thermally and/or mechanically demanding fields has not even been possible with reinforcing structures.

In the following, the invention will be explained in more detail by means of embodiments:

Figure 1:
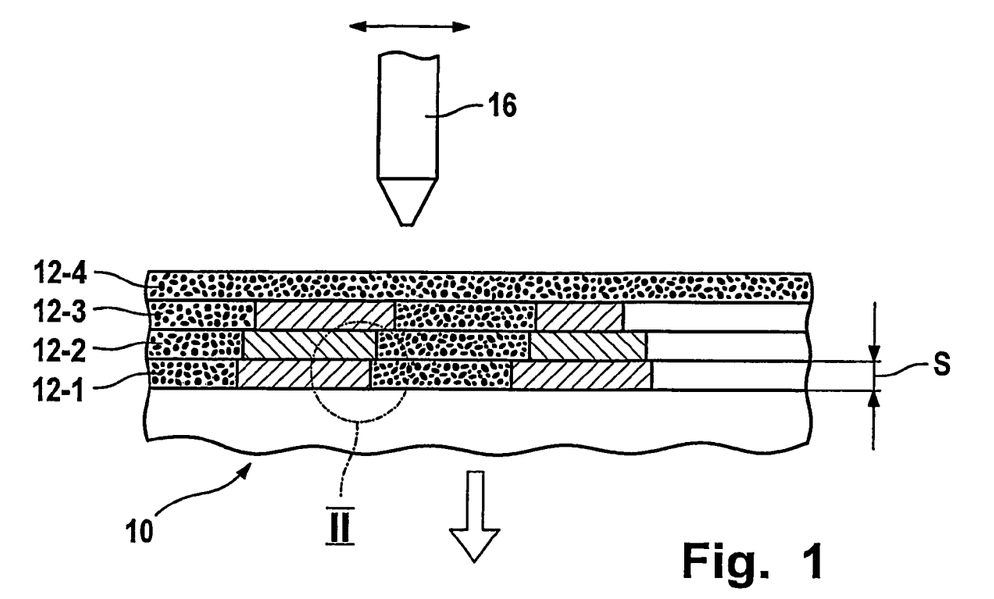
FIG. 1 a principle sketch to represent the functional principle of the layered manufacturing method.

FIG. 1 schematically shows how a component is produced by means of layered manufacturing methods. It reveals that powder layers 12-1, 12-2, . . . 12-n of the thickness S are successively applied on a platform 10 that is adapted to be lowered step-wise in an installation space. After the application of a layer, the particles 18 (cf. FIG. 2) are, by an energy jet from an energy source 16, selectively fused or melted at specified regions, this causing the regions 14 that are indicated in a hatched manner in the Figure to originate, which thus become part of the component to be produced. The platform is subsequently lowered by the layer thickness S, whereupon a new powder layer of the layer thickness S is applied. The energy jet again runs over a predetermined region, this causing the corresponding regions to be fused and to be melted or connected with the regions fused in the previous layer. This way, a multi-layer powder block with an embedded molded body of complex structure is produced bit by bit. The molded body is removed from the powder block and, as a rule manually, cleaned from adhesive or sintered residue powder.

Figure 2:
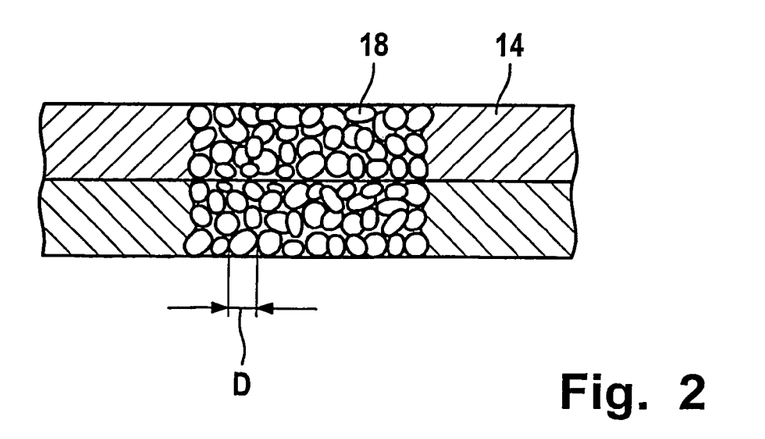
FIG. 2 the detail II in FIG. 1.

The layer thickness is chosen between 20 and 300 μm—depending on the field of application—, wherein—as may be seen from FIG. 2—the majority of the powder particles 18 has a grain diameter D of approximately ⅓ of the layer thickness S.

Conventionally, the powder is formed by a thermoplastic, for instance, PA 11 or PA 12, so that the mechanical strength of the molded bodies remains restricted, which is caused by the small E-module in the range of 1.4 GPa and the low tensile strength in the range from 40 to 50 MPa.

The invention provides different approaches for the production of molded bodies with substantially improved mechanical characteristics, which are described in more detail in the following:

Embodiment 1:

The powder comprises a first matrix fraction that is present in the form of substantially spherical powder particles (18) and that is formed by an aromatic polyetherketone, in particular a polyaryletherketone (PEEK) plastic with the repeating unit Oxy-1,4-Phenylen-Oxy-1,4-Phenylen-Carbonyl-1, 4-Phenylen of the general formula Such a material may, for instance, be obtained under the trade name "PEEK" from the Company Victrex Plc. The material characteristics are a tensile strength of over 90 MPa and an E-module in the range of over 3.5 GPa (pursuant to ISO 527). Moreover, this material stands out by extremely good temperature stability, so that the molded bodies produced from it may also be used in fields that are thermally extremely demanding.

The production of powder particles from this material is preferably performed in accordance with one of the following methods:

1. spray drying
2. grinding; and
3. melt spraying or prilling

Spray Drying

Figure 3:
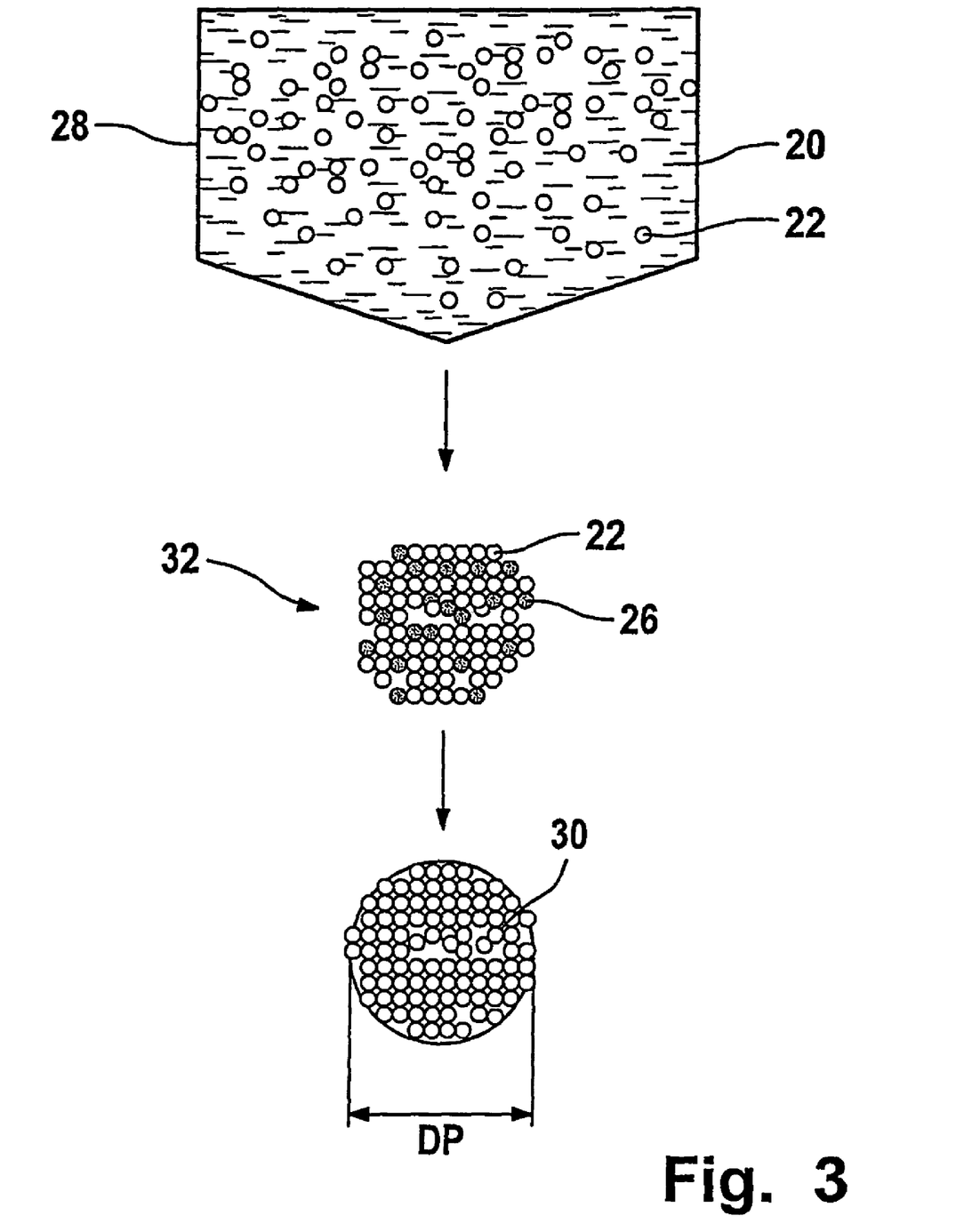
FIG. 3 the schematic representation of a method for the production of the powder in accordance with a first embodiment.

Here—as is shown in FIG. 3—a suspension is first of all produced with a matrix micro powder 22 stirred into a liquid phase, e.g. into an ethanol or an ethanol/water mixture 20. The particles of the matrix micro powder 22 have dimensions ranging substantially below the particle size DP of the powder particle 30 to be produced. A uniform mixing of the phases in the bin has to be attended to.

The suspension is sprayed through a nozzle that is not illustrated, so that droplets 32 containing matrix micro powder are formed. The liquid phase 26, in detail the surface tension of this phase, guarantees a substantially spherical shape of the droplets.

Subsequently—for instance, in a downstream heating path—the volatile fraction 26 of the droplets 32 is evaporated and/or volatilized, so that substantially spherical agglomerates 30 are left. These agglomerates 30 form the powder particles to be used in the later layered manufacturing method. Accordingly, the process parameters of the method are selected such that the particles are generated in the grain size distribution desired.

Grinding:

An alternative method consists in that the material that may, for instance, be obtained as a coarse granulate of a grain size of approximately 3 mm, is ground to a suitable fine powder.

In so doing, the coarse granulate is first of all cooled to a temperature ranging below the temperature at which an embrittlement of the material occurs. The cooling is, for instance, performed by liquid nitrogen. In this state, the coarse granulate may, for instance, be ground in a peg or cascade mill. The ground powder is finally—preferably in an air separator—separated in correspondence with a predetermined fractional spectrum to be obtained.

The method step of grinding may take place with further cooling.

In order that the ground powder gets a sufficiently smooth and preferably spherical surface, it is of advantage to subject the ground good to a smoothing treatment, for instance, by the embedding or agglomerating of micro or nano particles such as Aerosil.

Melt Spraying or Prilling:

A third method variant of the production of fine powder from aromatic polyetherketone, in particular a polyaryletherketone, consists in that a melt spraying method is used.

Here, the material is melted in a crucible comprising a connection to a spray nozzle with which the material is atomized.

Small droplets leave the nozzle. Due to the surface tension of the material, these droplets assume a substantially spherical shape. As the droplets are subsequently moved through a cooling path, they solidify in this spherical shape, so that powder of the quality desired for the layered manufacturing method is available.

Hot gas is preferably used for atomizing. By means of a so-called pebble heater, the hot gas that is used for spraying, i.e. for atomizing the fused material, is generated.

As a rule, the method step of spraying is followed by a separating process so as to obtain powder particles in correspondence with a predetermined fractional spectrum.

Alternatively to melt spraying—to the extent that the matrix material permits so—, prilling may also be used, where a liquid phase of the matrix powder is used instead of a melt. The liquid phase may, for instance, be obtained by liquefying the matrix material by means of a solvent.

The remaining method steps are equipped in analogy to melt spraying or spray drying, respectively, wherein the droplets assume a permanent spherical shape during the running or flowing through a solidifying path. The solidification of the droplets may, for instance, be performed in that the solvent is transferred to the gaseous state of aggregation. This may, for instance, take place by evaporating or volatilizing. In this method step, the volatilizing heat of the solvent may be used for heating, and thus for accelerating the process of solidification.

Figure 4:
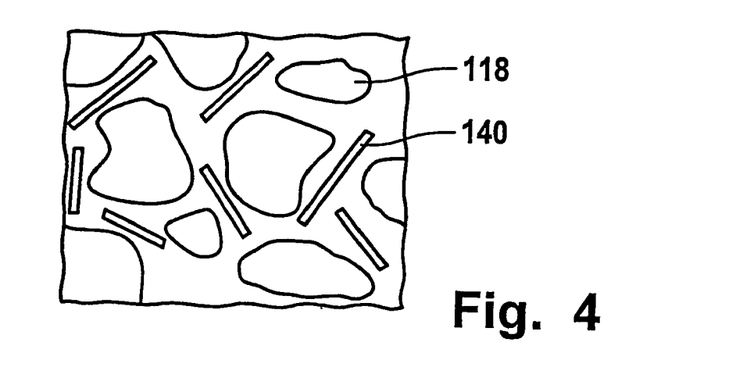
FIG. 4 a schematic view of a powder in accordance with a further embodiment of the invention.

Embodiment 2:

As is illustrated schematically in FIG. 4, a powder comprising a first fraction that is present in the form of substantially spherical powder particles 118 and that is formed by a matrix material, and at least one further fraction in the form of strengthening and/or reinforcing fibers 140 was used. The matrix fraction may be formed of a metal or a thermoplastic plastic material.

The following experiment was performed:

PA12 powder with a grain size distribution d50 of approximately 50 μm was mixed with 10 percent carbon fibers by volume of two different types with a medium fiber length L50 of approx. 70 μm and a fiber thickness of 7 μm. It was possible to process the powder obtained such to flawless molded bodies on commercial rapid prototyping machines.

It was possible to substantially improve the mechanical characteristics of the test body produced on the basis of this powder/fiber mixture in accordance with to the layered manufacturing method vis-à-vis a component that does not contain any fibers. In detail, it was possible to increase the E-module to over 3.8 GPa and the tensile strength to approximately 70 MPa.

These test results were compared with results with components obtained by means of injection molding from PA12 mixed with fibers, wherein the fibers added to the injection molding mass were available with equal volume concentration and equal size distribution. The measurement results showed that the mechanical characteristics of the components obtained in accordance with the layered manufacturing method are by no way inferior to those of the injection-molded components. In the sintered body, it was even possible to increase the E-module.

Although the fraction of fibers in the fine powder can be varied as a function of the medium grain size and the distribution thereof, it is, as a rule, not possible to raise it above 25% without problems. In order to be able to nevertheless realize improved material characteristics, the third embodiment of the invention lends itself.

Figure 5:
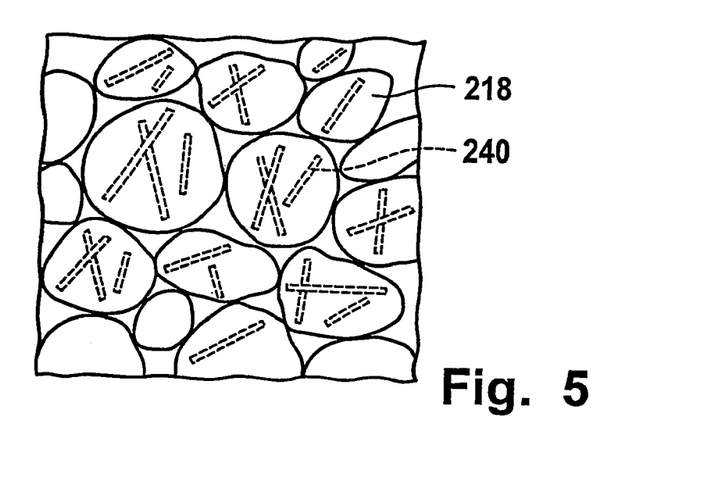
FIG. 5 a schematic view of a powder in accordance with a further variant of the invention.

Embodiment 3:

In accordance with the third embodiment that is illustrated schematically in FIG. 5, a powder is produced which comprises substantially higher fiber fractions, namely more than 30 percent by volume, and which is nevertheless of such a structure that it can be used, due to its good flow capability, in a layered manufacturing method.

The particularity consists in that the fibers 240 are embedded into substantially spherical powder molded bodies 218 that form the matrix material of the component to the produced, preferably such that they are substantially fully enclosed by the matrix material, as is indicated in FIG. 5.

For the production of such a powder, the afore-described methods, i.e. spray drying, grinding, prilling, and melt spraying, are suitable with slight modifications:

Spray Drying

Figure 6:
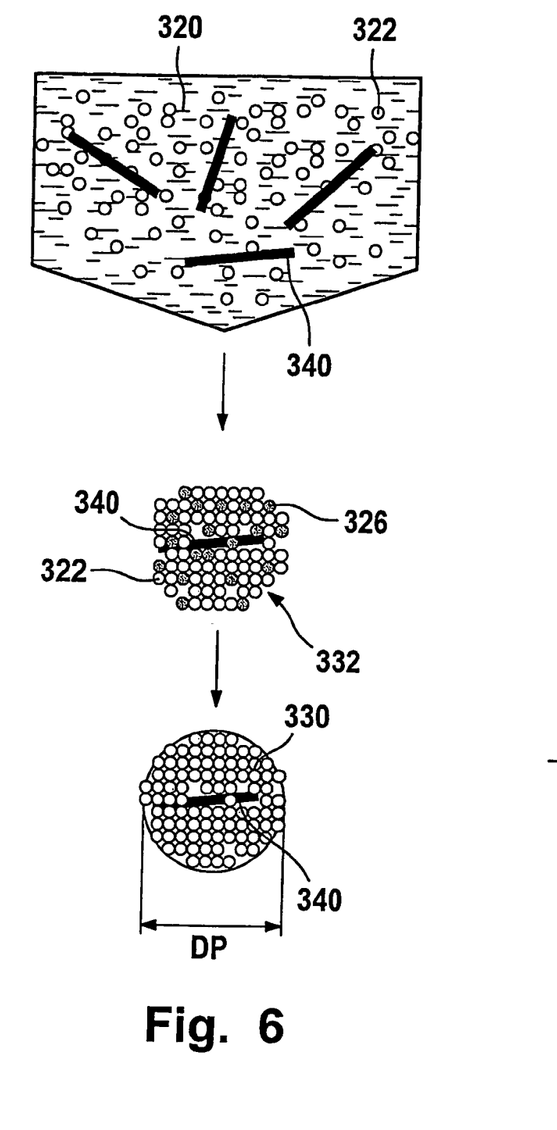
FIG. 6 the schematic representation of a method for the production of the powder according to FIG. 5 pursuant to an embodiment.

This method is illustrated schematically in FIG. 6. It differs from the method described before with respect to FIG. 3 only in that, in addition to matrix micro powder 322, strengthening or reinforcing fibers 340 are stirred into the liquid phase such as into an ethanol or an ethanol/water mixture. The particles of the matrix micro powder 322 have dimensions ranging substantially below the particle size DP of the powder particle 330 to be produced. The fiber lengths are also selected such that their medium length does not lie above the medium grain size of the powder particles to be achieved. A uniform mixing of the phases in the bin again has to be attended to.

When spraying the suspension through a nozzle that is not illustrated, droplets 332 containing matrix micro powder and fiber(s) are formed. The liquid phase 326, in detail the surface tension of this phase, guarantees a substantially spherical shape of the droplets.

When the volatile fraction 326 of the droplets 332 subsequently evaporates and/or volatilizes, substantially spherical agglomerates 330 are again left. These agglomerates 330 form the powder particles to be used in the later layered manufacturing method. Accordingly, the process parameters of the method are selected such that the particles are generated in the grain size distribution desired.

Good results can be achieved with spray drying if micro powders with a medium grain size d50 between 3 and 10 µm, preferably 5 µm, are used.

If fibers are stirred into, they should—if the matrix material is a plastic material—preferably be used with a medium length L50 from 20 to 150 µm, preferably from 40 to 70 µm.

In the case of a metallic matrix material, the lengths of the fibers have as a rule to be chosen shorter. An advantageous range for the medium fiber length L50 lies between 10 and 100 µm, preferably between 10 and 80 µm.

Advantageously, the process parameters are set such that substantially spherical micro droplets with a medium diameter D50 from 10 to 70 µm are generated.

The evaporating or volatilizing step is advantageously performed while the droplets are moved through a heating path.

Figure 7:
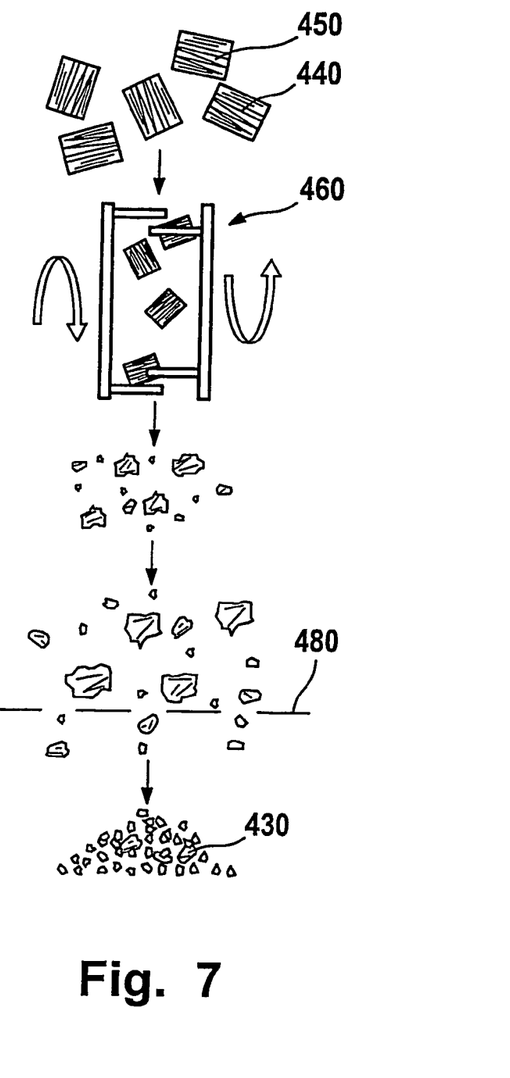
FIG. 7 the schematic representation of another method for the production of the powder according to FIG. 5.

Grinding:

An alternative method that is illustrated schematically in FIG. 7 consists in that a material containing fibers, e.g. carbon fibers 440, and that is, for instance, available as a coarse granulate 450 of approximately 3 mm grain size or edge length, is ground to a suitable fine powder.

In so doing, the coarse granulate 450 is first of all again cooled to a temperature ranging below the temperature at which an embrittlement of the material occurs. The cooling is, for instance, performed by liquid nitrogen. In this state, the coarse granulate can, for instance, be ground in a peg mill—indicated by 460. The ground powder is finally separated in a separator 480—preferably an air separator—in correspondence with a predetermined fractional spectrum to be achieved. The powder particles to be used are designated with 430.

The method step of grinding may again be performed with further cooling. An optional smoothing process by the embedding or agglomerating of micro or nano particles such as Aerosil may also follow.

Melt Spraying or Prilling:

The afore-described further method variant, namely the so-called melt spraying, may also be used for the production of powder in accordance with FIG. 5.

In contrast to the afore-described method, the fiber fraction is stirred into the fused melt of matrix material.

Alternatively to melt spraying—to the extent that the matrix material permits so—, prilling may again be used, wherein a liquid phase of the matrix powder is used instead of a melt. The liquid phase may, for instance, be obtained by liquefying the matrix material by means of a solvent.

The remaining method steps are equipped in analogy to melt spraying or spray drying, wherein the droplets enclosing the strengthening fibers assume a permanent spherical shape while running or flowing through a solidifying path. The solidification of the droplets may, for instance, be performed in that the solvent is transferred to the gaseous state of aggregation. This may, for instance, take place by evaporating or volatilizing. The volatilizing heat of the solvent may, in this method step, be used for heating and thus for accelerating the solidification process.

The afore-described embodiments permit the processing of both thermoplastic plastic materials and metallic materials.

Different materials may also be mixed.

If the matrix material is formed by a thermoplastic plastic material, the fibers are selected from the group of carbon and/or glass fibers.

The medium grain size of the spherical powder particles shall basically not be restricted. Good results with commercial machines can, at any rate, be achieved if the medium grain size d50 of the spherical powder particles lies in the range from 20 to 150, preferably from 40 to 70 µm. The flow capability of such a powder can still be increased by homogenization of the size distribution.

If the matrix material is formed by a metallic material, the fibers are preferably selected from the group of ceramic and boron fibers. With such a powder, the medium grain size d50 of the spherical powder particles has, as a rule, a lower value, for instance, in the range from 10 to 100, preferably from 10 to 80 μm.

The description reveals that, with the inventive powder for use with layered manufacturing methods (powder-based generative rapid prototyping methods), e.g. pursuant to SLS (Selective Laser Sintering) or to laser melting technology, it is possible to produce three-dimensional structures or molded bodies whose mechanical and/or thermal characteristics have been unimaginable so far.

Thus, the E-module of PEEK can, if it is reinforced with 10, 20, or 30 percent carbon fibers by volume that have been added to the powder particles or mixed therewith in accordance with any of the described methods, be increased to 7, 13.5, or 22.2 GPa, while the tensile strength can be increased to 136, 177, or 226 MPa.

If PA12 is used as matrix material, the following improvement of the mechanical characteristics results with a fiber fraction of 10, 20, or 30 percent by volume: E-module of 3.4 or 6.6 or 13.9 GPa; tensile strength of 66 or 105 or 128 Mpa.

Figures 8, 8A:
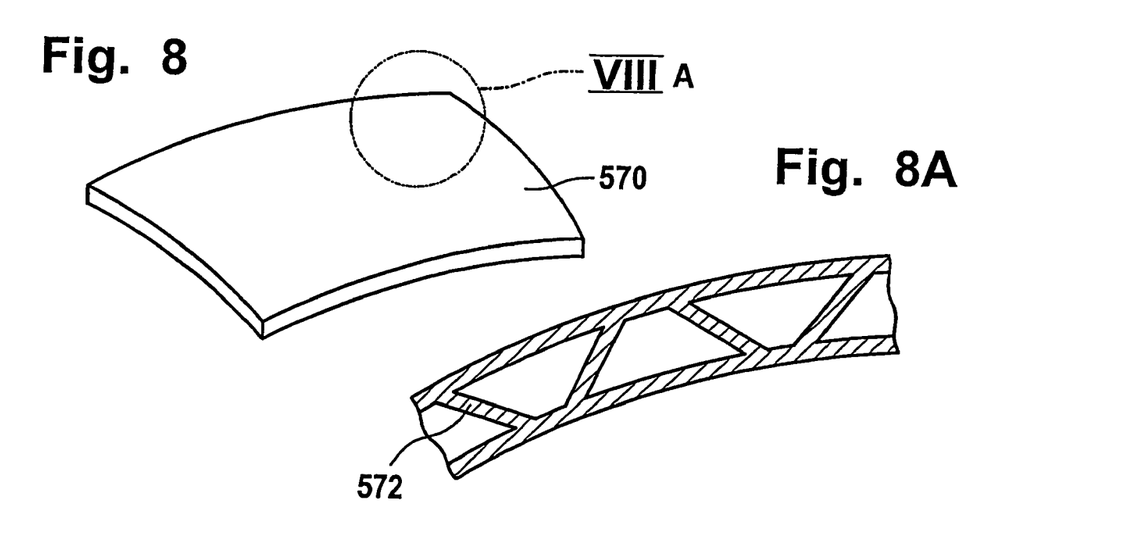
FIG. 8 the schematic view of a section of a component that can be produced by using the inventive powder.
FIG. 8A the detail VIII in FIG. 8.

Thus—as indicated schematically in FIGS. 8, 8A—, one has for the first time succeeded in meaningfully using the layered manufacturing method for the production of hollow, complex-shaped, e.g. multiply bent molded bodies 570 with interior, preferably three-dimensional framework-like struts 572, so that not just extremely light, but also thermally and mechanically most strainable components can be produced.

Deviations from the afore-described embodiments are, of course, possible without leaving the basic idea of the invention. Thus, post treatment steps of the individual powder production methods may also be used for other methods. The smoothing process to be performed by means of micro bodies may, of course, also be used with the two methods that have been described alternatively.

The invention thus provides new powders for use in the production of three-dimensional structures or molded bodies by means of layered manufacturing methods, and methods for the economical production thereof. The powders have the particularity that they have a good flow behavior, on the one hand, and that they are simultaneously configured such that the molded body produced with the powder in rapid prototyping has substantially improved mechanical and/or thermal characteristics. In accordance with a particularly advantageous embodiment, the powder comprises a first fraction that is present in the form of substantially spherical powder particles and that is formed by a matrix material, and at least one further fraction in the form of strengthening and/or reinforcing fibers that are preferably embedded into the matrix material.

The invention claimed is:

1. A method for producing a powder comprising essentially spherical powder particles of an aromatic polyether ketone plastic for use in providing a very uniform powder surface in the production of three-dimensional structures or molded bodies by means of layered manufacturing methods, the method comprising:
    melting a matrix material;
    blowing the melted matrix material through a nozzle to form droplets;
    passing the droplets through a cooling segment, wherein a medium grain size $d_{50}$ of the spherical powder particles lies in a range from about 20 micrometers (μm) to about 150 μm; and
    stirring at least one of stiffening fibers or reinforcing fibers of a medium length not greater than that of the medium grain size into the melted matrix material before blowing the melted matrix material.

2. The method according to claim 1, wherein the droplets are formed in a hot gas jet.

3. The method according to claim 1, further comprising: separating the cooled droplets into a fraction spectrum.

4. A method for producing a powder comprising a first component in the form of essentially spherical powder particles and at least one of a stiffening fiber or a reinforcing fiber for use in the production of three-dimensional structures or molded bodies by means of layered manufacturing methods, wherein the first component comprises a matrix material, the method comprising:
    melting a matrix material;
    blowing the melted matrix material through a nozzle to form droplets; and
    passing the droplets through a cooling segment, and wherein a medium length L50 of the fibers does not lie above the medium grain size $d_{50}$ of the spherical powder particles to be achieved.

5. The method according to claim 4, further comprising: stirring at least one of the stiffening or reinforcing fibers into the melted matrix material before blowing the melted matrix material.

6. The method according to claim 4, wherein the droplets are formed in a hot gas jet.

7. The method according to claim 4, further comprising: separating the cooled droplets into a fraction spectrum.

* * * * *